(12) United States Patent
Fujioka et al.

(10) Patent No.: US 11,050,170 B2
(45) Date of Patent: Jun. 29, 2021

(54) PIPE CONDUCTOR AND CONDUCTIVE PATH

(71) Applicant: SUMITOMO WIRING SYSTEMS, LTD., Yokkaichi (JP)

(72) Inventors: Ryo Fujioka, Yokkaichi (JP); Hirokazu Nakai, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 16/757,906

(22) PCT Filed: Oct. 12, 2018

(86) PCT No.: PCT/JP2018/038018
§ 371 (c)(1),
(2) Date: Apr. 21, 2020

(87) PCT Pub. No.: WO2019/087731
PCT Pub. Date: May 9, 2019

(65) Prior Publication Data
US 2020/0343651 A1    Oct. 29, 2020

(30) Foreign Application Priority Data
Nov. 2, 2017 (JP) .............................. JP2017-212396

(51) Int. Cl.
*H01R 4/60* (2006.01)
*H01R 4/18* (2006.01)
*H01R 43/048* (2006.01)

(52) U.S. Cl.
CPC ............... *H01R 4/60* (2013.01); *H01R 4/183* (2013.01); *H01R 43/048* (2013.01)

(58) Field of Classification Search
CPC . H01R 4/18; H01R 4/20; H01R 4/183; H01B 7/02; H01B 7/04; H01B 7/0009; H01B 13/0036; H02G 15/1806
(Continued)

(56) References Cited

U.S. PATENT DOCUMENTS 3,807,775 A * 4/1974 Addis ...................... H01R 4/60
285/96
9,666,955 B2 * 5/2017 Sugino .................. H01R 12/63
(Continued)

FOREIGN PATENT DOCUMENTS

JP     S49-145186 U    12/1974
JP     2001-196109 A    7/2001
(Continued)

OTHER PUBLICATIONS

Jan. 15, 2019 International Search Report issued in International Patent Application No. PCT/JP2018/038018.

*Primary Examiner* — William H. Mayo, III
(74) *Attorney, Agent, or Firm* — Oliff PLC (57) ABSTRACT

A pipe conductor is formed by a conductive tubular body. The pipe conductor includes a connection for connecting with another conductor. The connection is formed by crushing an end of the conductive tubular body in an axial direction. A flat surface is formed on a first surface of the connection, and a surface having a groove is formed on a second surface of the connection. The groove reaches a tip end of the connection, and an end of the another conductor is in contact with only the flat surface.

8 Claims, 6 Drawing Sheets

(58) Field of Classification Search
USPC .................. 174/74 R, 77 R, 84 R, 88 R
See application file for complete search history.

(56) References Cited

U.S. PATENT DOCUMENTS

| | | | | |
|---|---|---|---|---|
| 9,991,026 | B2* | 6/2018 | Kanagawa | B60L 50/16 |
| 10,319,495 | B2* | 6/2019 | Kuroishi | H01B 7/0009 |
| 10,373,736 | B2* | 8/2019 | Nakai | H01B 7/17 |
| 10,407,000 | B2* | 9/2019 | Araki | H01R 4/021 |
| 10,501,029 | B2* | 12/2019 | Nakai | H01R 11/28 |
| 10,797,457 | B2* | 10/2020 | Sato | H01R 4/021 |
| 10,897,096 | B2* | 1/2021 | Izawa | H01R 4/02 |
| 2006/0121773 | A1* | 6/2006 | Ichikawa | H01R 13/5216 439/408 |
| 2008/0081499 | A1* | 4/2008 | Sumi | H01R 4/023 439/207 |
| 2010/0001502 | A1* | 1/2010 | Goto | B62D 25/088 280/796 |
| 2014/0110459 | A1* | 4/2014 | Kataoka | H01R 43/0207 228/111 |
| 2016/0071630 | A1* | 3/2016 | Sugino | H01R 4/021 174/68.3 |
| 2016/0148720 | A1* | 5/2016 | Kanagawa | H01B 7/04 174/115 |
| 2019/0157775 | A1* | 5/2019 | Nakai | H01R 4/62 |

FOREIGN PATENT DOCUMENTS

| | | | | |
|---|---|---|---|---|
| JP | 2006-190662 A | | 7/2006 | |
| JP | 2010-13057 A | | 1/2010 | |
| JP | 2016-136460 A | * | 7/2016 | ............ H01B 7/00 |
| JP | 2016-219234 A | | 12/2016 | |

* cited by examiner

PIPE CONDUCTOR AND CONDUCTIVE PATH

BACKGROUND

The present disclosure relates to a pipe conductor and a conductive path.

Techniques for using conductive tubular bodies for conductive paths are conventionally known. JP 2016-219234A below, for example, describes a conductive path in which a pipe made of metal is used for a conductive path, and twisted wires that are likely to deform by bending are electrically connected to end portions of the pipe. Due to the wires that are likely to bend being provided at the end portions of the pipe, connection with an apparatus and the like can be easily performed. The end portions of the pipe are flattened to be shaped like a flat plate, and each twisted wire is connected to one plate surface thereof.

SUMMARY

However, with the above-described configuration, since the plate surfaces at the end portions of the pipe are both flat and the external appearances thereof are substantially the same, there is a problem in that it is not easy to find a surface to which another wire such as a twisted wire is to be connected.

An exemplary aspect of the disclosure provides a pipe conductor and a conductive path in which a surface to which another conductor is to be connected can be easily recognized.

A pipe conductor according to the present disclosure is a conductive tubular body including: a connection for connecting with another conductor, the connection being formed by crushing an end of the conductive tubular body in an axial direction; a flat surface formed on a first surface of the connection; and a surface having a groove formed on a second surface of the connection.

A conductive path according to the present disclosure includes the pipe conductor and another conductor connected to the first surface of the connection.

According to the present disclosure, since the appearance of a surface (flat surface) to which another conductor is to be connected is different from that of another surface, it is possible to easily recognize a surface to which the other conductor is to be connected.

DETAILED DESCRIPTION OF EMBODIMENTS

Hereinafter, a preferable embodiment of the present disclosure will be described.

The pipe conductor according to the present disclosure may also be shaped such that the groove extends in an axial direction of the tubular body, and ribs protrude on both sides of the groove. With this configuration, it is possible to improve the strength of the connection portion.

Furthermore, in the pipe conductor according to the present disclosure, the width of the connection portion may also be equal to or smaller than a diameter of the tubular body. With this configuration, since it is possible to increase the thickness of the connection portion compared to a case where the width of the connection portion is larger than the diameter of the tubular body, it is possible to improve the strength.

Embodiment

Hereinafter, an embodiment in which the present disclosure is embodied will be described in detail with reference to FIGS. 1 to 9.

A conductive path E according to the present embodiment is to be mounted in a vehicle, and connects, for example, an apparatus M1 such as an auxiliary battery (12 V battery) mounted in the front portion of the vehicle body and an apparatus M2 such as a PDU (power drive unit) or an IPU (intelligent power unit) mounted in the rear portion of the vehicle body to each other. The conductive path E is attached under the floor of the vehicle body, for example, in an orientation extending in the front-rear direction.

Figure 1:
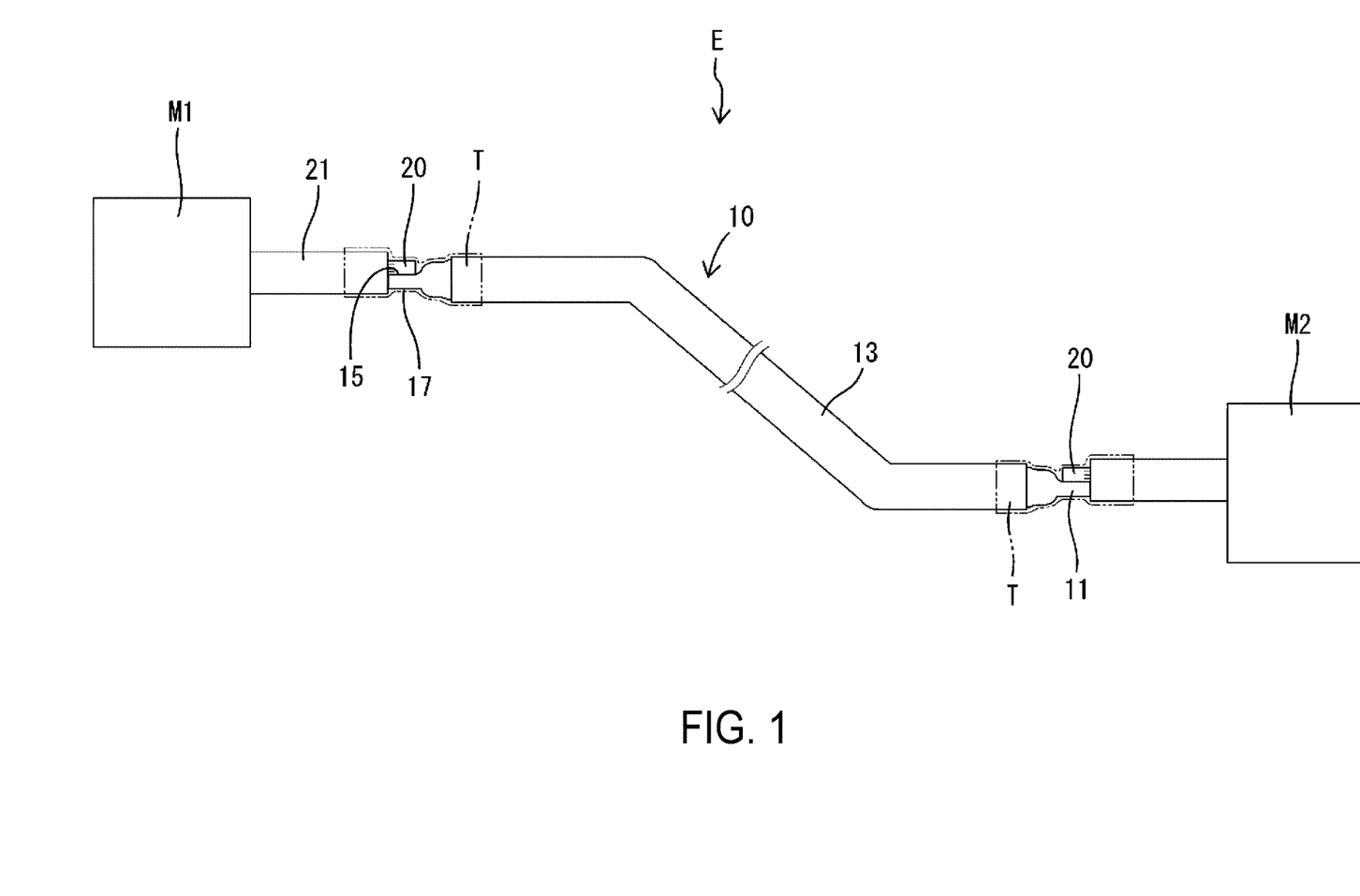
FIG. 1 is a side view schematically showing a conductive path according to an embodiment.
Figure 2:
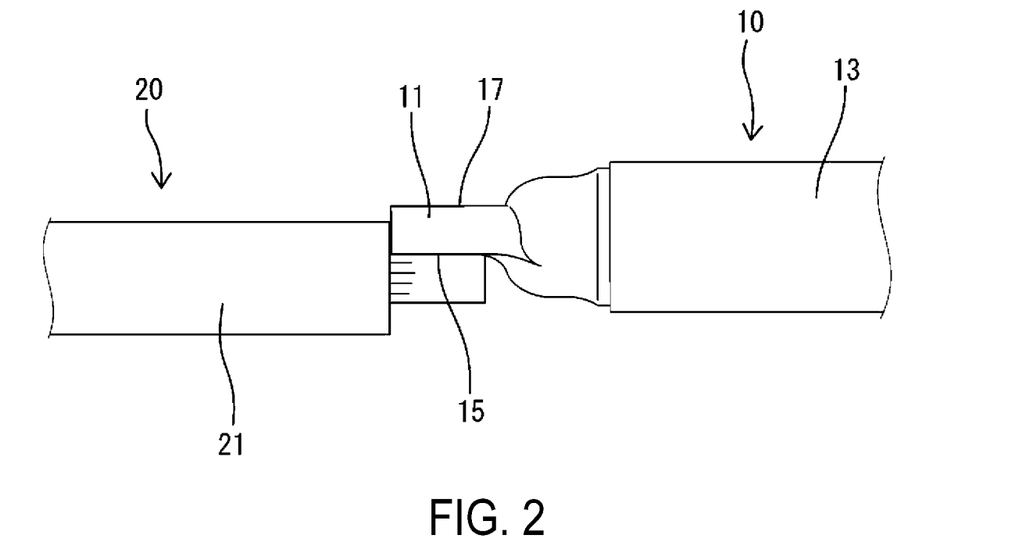
FIG. 2 is a partially enlarged side view showing a portion at which a pipe conductor and another conductor are connected to each other in an enlarged manner.
Figure 3:
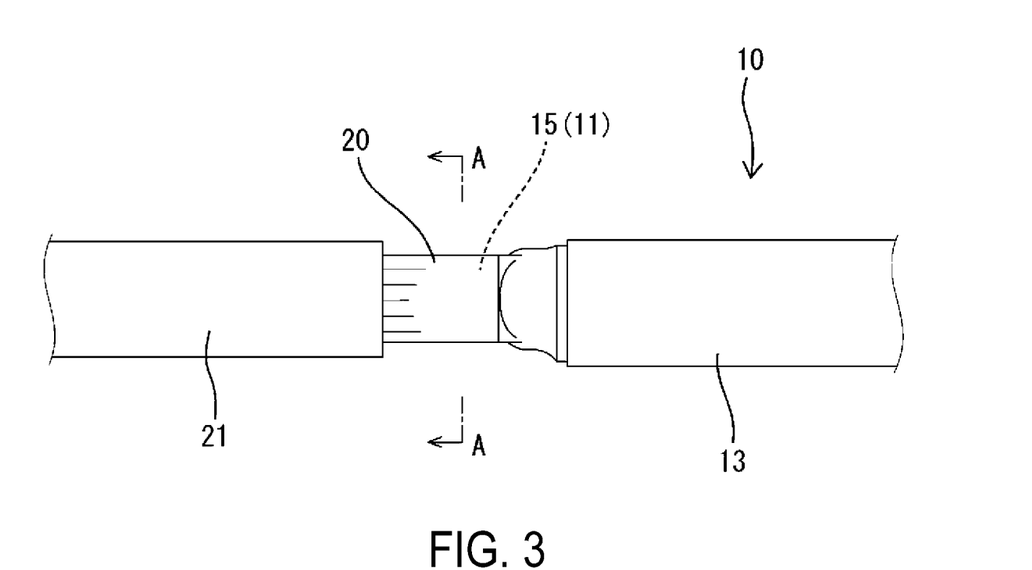
FIG. 3 is a partially enlarged plan view showing a portion at which the pipe conductor and the other conductor are connected to each other in an enlarged manner.

The conductive path E is formed by electrically connecting a pipe conductor 10 and other conductors 20 to each other in a length direction.

The other conductors 20 have excellent flexibility and can be easily bent into a desired shape. The other conductors 20 are twisted conductors formed by twisting a plurality of metal strands. The other conductors 20 are made of copper, a copper alloy, aluminum, or an aluminum alloy, for example. Approximately the entire length of each other conductor 20 is enveloped by an insulating coating 21. The two end portions of each other conductor 20 are stripped of the insulating coating 21 and exposed to the outside over a predetermined length range. A terminal fitting (not shown) is connected to one of the two end portions of each other conductor 20, and the other end portion is connected to the pipe conductor 10. The terminal fittings are connected to the apparatuses M1 and M2. Since the other conductors 20, which have excellent bendability, are provided at the two end portions in the length direction of the conductive path E, it is possible to easily perform a task of connecting to the apparatuses M1, M2, and the like.

The pipe conductor 10 has relatively high rigidity, and has a shape retaining property according to which the shape is maintained when bent to a predetermined shape. The pipe conductor 10 is provided in most part of the conductive path E excluding the two end portions. As a result, since most of the conductive path E is maintained in a predetermined shape, it is possible to prevent the conductive path E from sagging and the like. Accordingly, if a flexible electrical wire is used, points at which the wire is fastened to the vehicle body tend to increase in order to prevent the wire from sagging, but with the conductive path E of the present embodiment, such a case can be suppressed.

The pipe conductor 10 is formed by bending in three-dimensional directions along a predetermined routing path. The pipe conductor 10 is a long conductive tubular body made of metal, and for example, is made of a material such as aluminum, an aluminum alloy, copper, or a copper alloy. Note that if the pipe conductor 10 is made of aluminum or an aluminum alloy, it is possible to reduce the weight and improve the heat dissipation performance. The tubular body has a cross-section that is an exact circle (a circle that is not an oval or an ellipse), and a hollow interior.

The pipe conductor 10 is provided with connection portions 11 (connection) to which the other conductors 20 are to be connected, and a pipe main body 12 constituting most of the pipe conductor 10 excluding the connection portions 11. The pipe main body 12 is a part of the tubular body that has not been pressed, and has a cross section that is an exact circle. The pipe main body 12 is enveloped by an exterior material 13, and is thereby insulated and protected. The exterior material 13 is made of a synthetic resin, and for example, a hard tube is used. The exterior material 13 is in close contact with the outer circumferential surface approximately over the entire length of the pipe main body 12. Due to the exterior material 13 being in close contact with the pipe main body 12, the heat dissipation capacity of the pipe conductor 10 can be improved.

The connection portions 11 are formed by crushing the end portions (ends) in the axial direction of the tubular body. The connection portions 11 are pressed to be crushed such that the space inside the tubular body is substantially filled.

Figure 4:
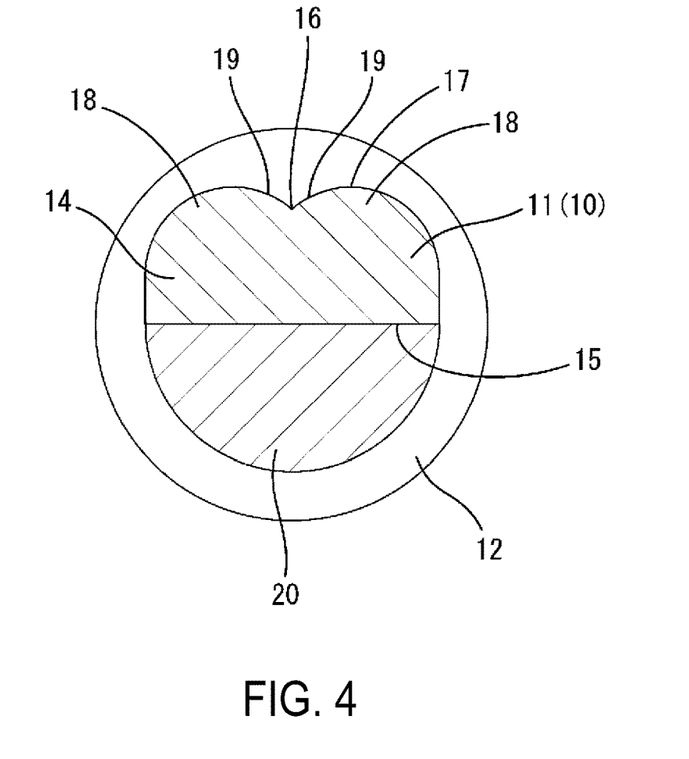
FIG. 4 is a cross-sectional view showing a portion at which the pipe conductor and the other conductor are connected to each other, corresponding to a cross-section taken along position A-A in FIG. 3.
Figure 5:
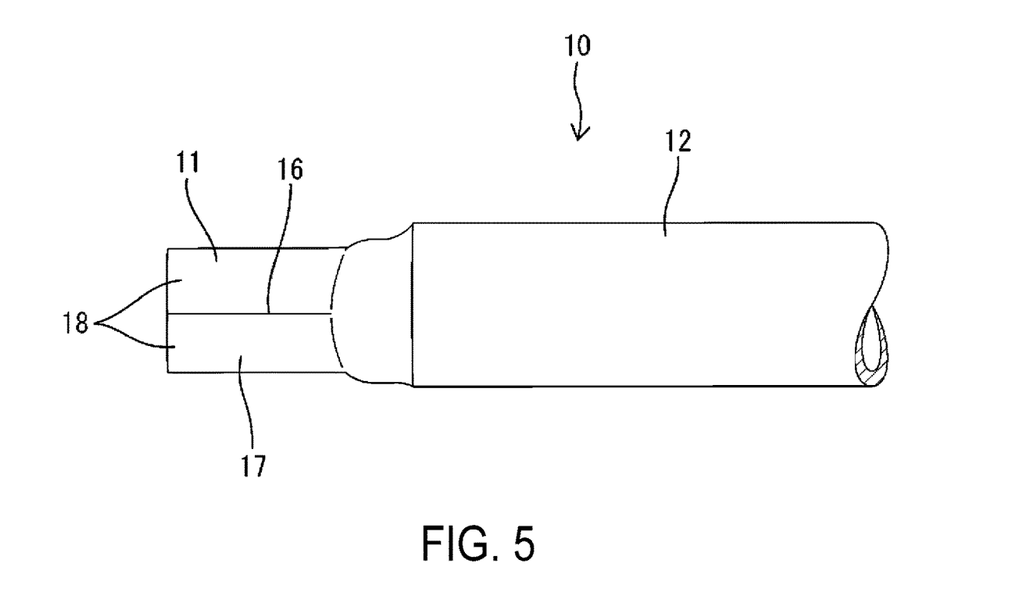
FIG. 5 is a partially enlarged plan view showing an end portion of the pipe conductor in an enlarged manner.
Figure 6:
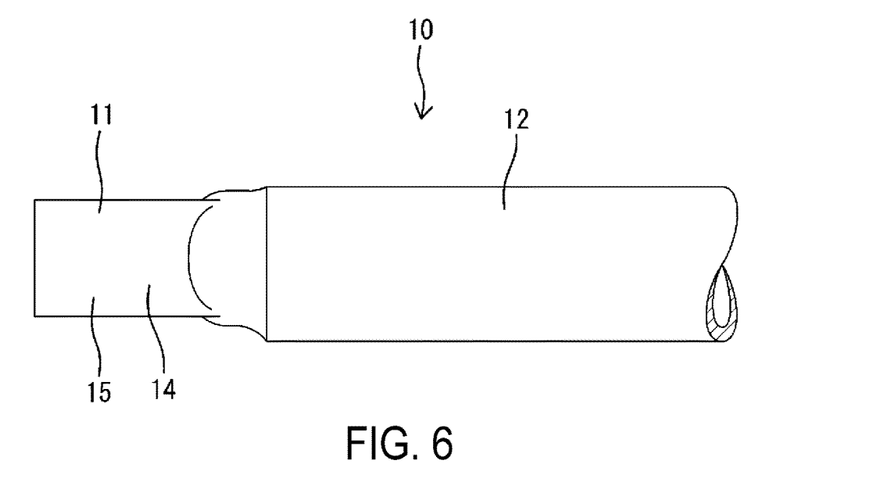
FIG. 6 is a partially enlarged bottom view showing an end portion of the pipe conductor in an enlarged manner.

The entirety of each connection portion 11 has a substantially constant thickness (a dimension in an up-down direction in FIG. 4). The thickness of the connection portion 11 is smaller than the outer diameter of the pipe main body 12. As shown in FIGS. 5 and 6, in a plan view, the connection portion 11 is rectangular and slightly elongated in the axial direction of the pipe conductor 10. The width (a dimension in a direction intersecting the axial direction) of the connection portion 11 is equal to or slightly smaller than the outer diameter of the pipe main body 12. As shown in FIG. 4, the entirety of the connection portion 11 is arranged within a projection surface in the axial direction of the pipe main body 12. In other words, the entirety of the outer circumferential surface of the connection portion 11 is located on the inner side in the radial direction of the outer circumferential surface of the pipe main body 12. The connection portion 11 is arranged on one side with respect to the center in the radial direction of the pipe main body 12.

A flat surface (hereinafter called a first surface 15) is formed on one surface (first surface) of the connection portion 11, and a surface having a groove 16 (hereinafter called a second surface 17) is formed on the other surface (second surface). The first surface 15 is arranged toward the center in the radial direction of the pipe main body 12 of the connection portion 11, and the second surface 17 is arranged on the outer side in the radial direction of the pipe main body 12 of the connection portion 11. The first surface 15 and the second surface 17 are in a front-back relation.

As shown in FIG. 6, the first surface 15 is a flat and smooth over the entirety of the connection portion 11. The first surface 15 passes through the center, or a position near the center in the radial direction of the pipe main body 12.

As shown in FIG. 5, in the second surface 17, the groove 16 extends in the axial direction of the pipe conductor 10 and ribs 18 protrude from both sides of the groove 16. Only one groove 16 is provided in approximately the center in the width direction of the connection portion 11. The groove 16 continuously and linearly extends from the tip end of the connection portion 11 (the end in the axial direction) to the other end (the end on the pipe main body 12 side). The groove 16 is approximately parallel with the axis line of the pipe main body 12.

As shown in FIG. 4, the left and right side surfaces (the two side surfaces in the width direction) 19 of the groove 16 are bilaterally symmetric with respect to the center in the width direction of the groove 16. The left and right side surfaces 19 of the groove 16 are curved like an arc. The left and right side surfaces 19 of the groove 16 gradually decline toward the center in the width direction of the groove 16, and the depth of the center (the position where the left and right side surfaces 19 intersect each other) in the width direction of the groove 16 is the deepest.

The pair of ribs 18 are provided on both sides of the groove 16. The pair of ribs 18 are arranged side by side in the surface direction on the second surface 17 of the connection portion 11 and protrude in a substantially vertical direction with respect to the surface direction. Opposing surfaces of the pair of ribs 18 form the left and right side surfaces 19 of the groove 16. The pair of ribs 18 are shaped substantially symmetric with respect to the groove 16. The pair of ribs 18 extend over the entire width of the connection portion 11. In other words, the width of each rib 18 is substantially half the width of the connection portion 11. The cross section of each rib 18 is substantially the same and continuous from the tip end to the other end of the connection portion 11. The outer surface of each rib 18 is shaped like an arc having a center point toward the center of the connection portion 11.

As shown in FIG. 4, the end portions of the connection portion 11 and the other conductor 20 overlap with and are connected to each other in the radial direction. The other conductor 20 is welded on the first surface 15 of the connection portion 11. The end portion of the other conductor 20 is formed flat along the first surface 15. Due to the first surface 15 of the connection portion 11 being a flat surface, the other conductor 20 is likely to come into close contact therewith, and thus it is possible to improve the reliability of the connection between the pipe conductor 10 and the other conductor 20. Note that the connection portion between the pipe conductor 10 and the other conductor 20 is enveloped by a shrink tube T (see. FIG. 1).

Next, an example of a method for manufacturing the conductive path E of the present embodiment will be described.

Figure 7:
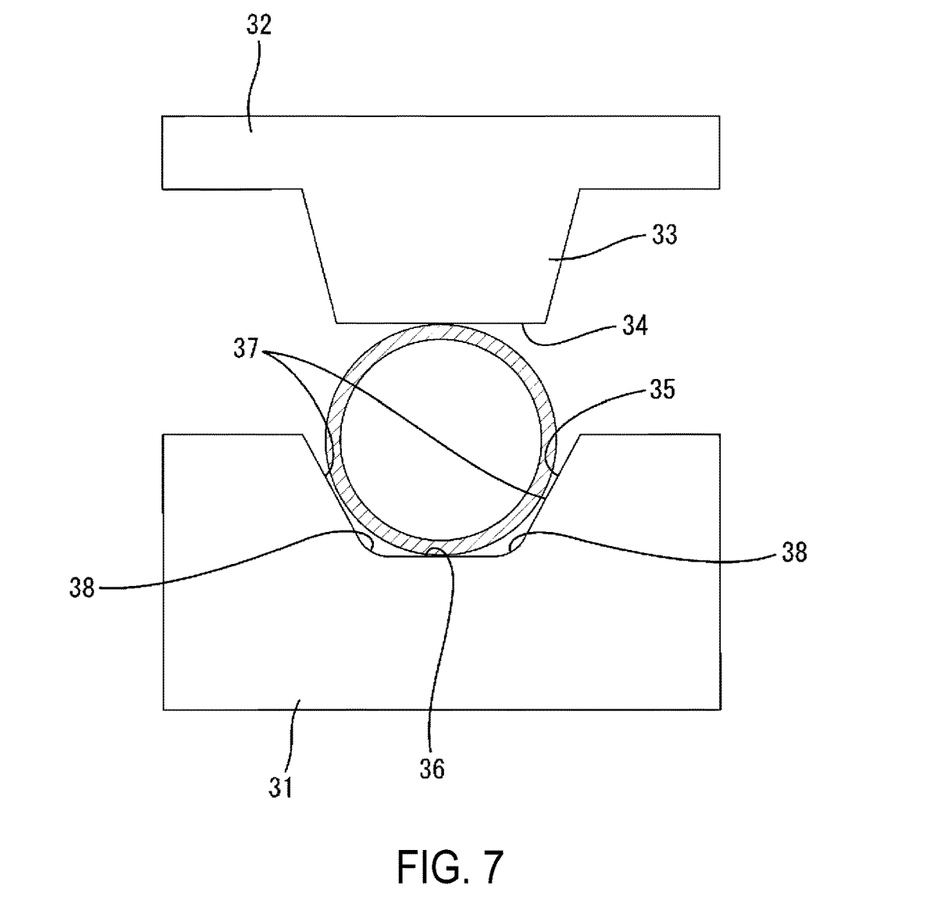
FIG. 7 is a schematic view showing a state before the end portion of the pipe conductor is crushed.
Figure 8:
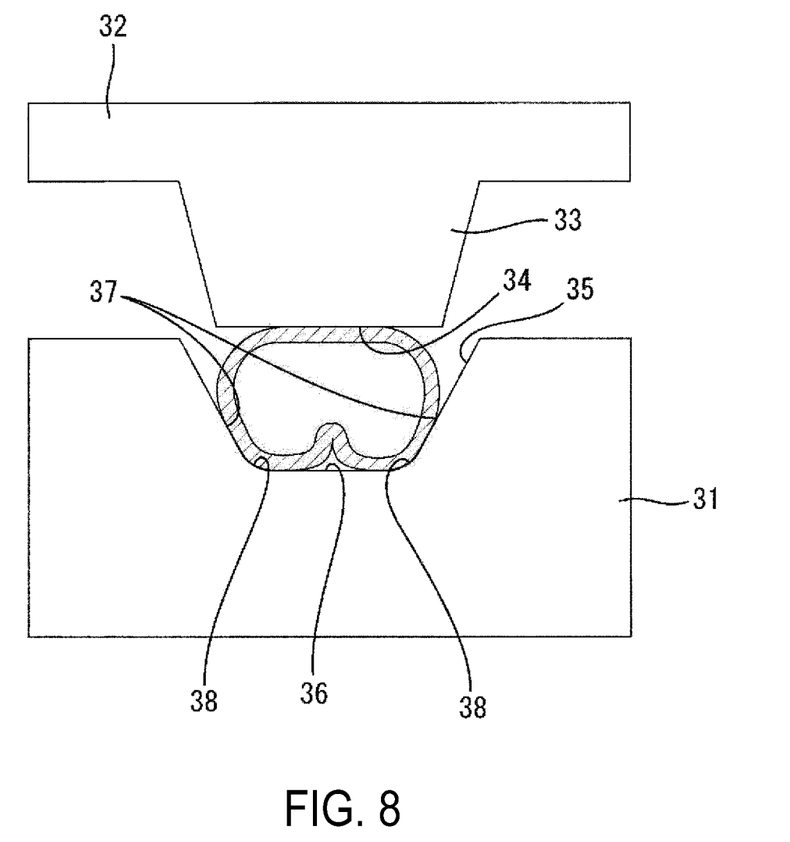
FIG. 8 is a schematic view showing a state where the end portion of the pipe conductor is being crushed.
Figure 9:
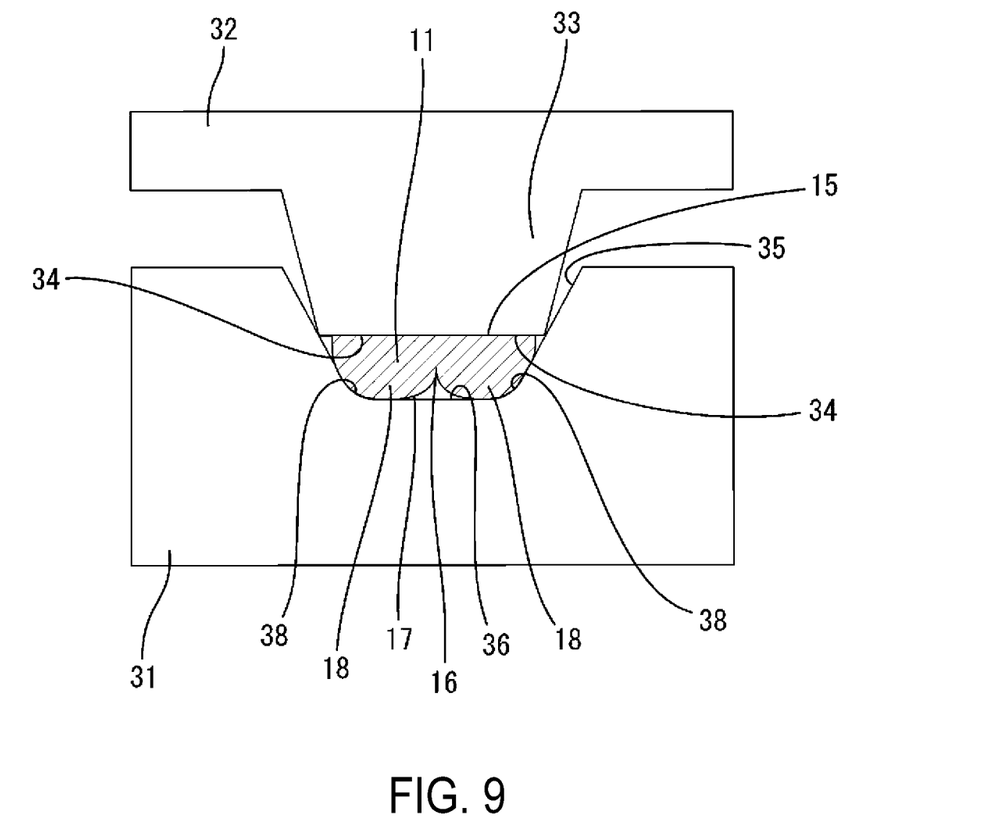
FIG. 9 is a schematic view showing a state after the end portion of the pipe conductor is crushed.

First, the connection portions 11 are formed at the end portions of the pipe conductor 10. As shown in FIGS. 7 to 9, each end portion of the pipe conductor 10 is held in a press mold, thereby forming the connection portions 11. The press mold includes a lower mold 31, which is a fixed mold, and an upper mold 32, which is a movable mold. The two molds close by the upper mold 32 approaching the lower mold 31, and open by the upper mold 32 separating from the lower mold 31.

The upper mold 32 is provided with a protrusion 33 for forming the first surface 15 of the connection portion 11. The protrusion 33 is provided with a pressing surface 34 for pressing the pipe conductor 10. The pressing surface 34 is a surface orthogonal to the direction in which the upper mold 32 slides.

The lower mold 31 is provided with a recess 35 for forming the second surface 17 of the connection portion 11. The recess 35 is provided with a bottom surface 36 facing the pressing surface 34 of the upper mold 32 and a pair of side surfaces 37 that stand upward from both edges in the width direction of the bottom surface 36. The pair of side surfaces 37 incline so that the gap between the side surfaces 37 (the width of the recess 35) gradually increases from the bottom surface 36 toward the upper end of the recess 35. The corners (intersection portions) formed by the bottom surface 36 and the side surfaces 37 are R portions 38 each having a curved shape with a rounded corner.

As shown in FIG. 7, the end portion of the pipe conductor 10 is placed in the recess 35 of the lower mold 31, and the protrusion 33 of the upper mold 32 is slid so as to fit in the recess 35 of the lower mold 31. The end portion of the pipe conductor 10 is pressed by the pressing surface 34 and gradually crushed between the pressing surface 34 and the bottom surface 36, and then formed into a flat shape. At this time, the portions of the end portion of the pipe conductor 10 that are in contact with the side surfaces 37 of the recess 35 slide along the side surfaces 37 and the R portions 38, and are gathered toward the center in the width direction of the bottom surface 36. The portions gathered toward the center of the bottom surface 36 abut against each other from the left and right, and protrude upward (into the hollow space). As a result, a recess is formed in the lower surface of the end portion of the pipe conductor 10, and the recess eventually forms the groove 16. Also, the second surface 17 of the pipe conductor 10 is formed into a curved shape extending along the R portions 38, and a pair of ribs 18 are formed. In this manner, the first surface 15 and the second surface are formed at the end portion of the pipe conductor 10. Thereafter, the upper mold 32 and the lower mold 31 are opened, and the pipe conductor 10 is removed. At this time, since the pair of side surfaces 37 are tapered, the mold can be easily opened. In this manner, the connection portions 11 are formed at the end portions of the pipe conductor 10.

Next, the other conductors 20 are connected to the connection portions 11 of the pipe conductor 10. The other conductors 20 are placed along the first surfaces 15 of the connection portions 11, and welded by an appropriate method such as ultrasonic welding, or resistor welding. At this time, since the grooves 16 are formed in the second surfaces 17 of the pipe conductor 10, it is possible to easily recognize that the second surfaces 17 are not surfaces to which the other conductors 20 are to be connected. Accordingly, the connection task can be smoothly performed, and it is possible to prevent a case where the other conductors 20 are mistakenly connected to the second surfaces 17.

Next, the connection portions between the pipe conductor 10 and the other conductors 20 are covered with the shrink tube T. The shrink tube T is placed so as to cover the region reaching from the exterior materials 13 of the pipe conductor 10 to the insulating coatings 21 of the other conductors 20.

In this manner, manufacturing of the conductive path E is complete.

Next, operations and effects of the embodiment configured as described above will be illustrated.

The pipe conductor 10 of the present embodiment is a conductive tubular body and includes the connection portions 11 for connecting to the other conductors 20 formed by crushing end portions in the axial direction, the flat first surface 15 is formed on one surface of each connection portion 11, and the second surface 17 having a groove 16 is formed on the other surface. With this configuration, since the external appearance of the surface (flat surface) to which the other conductor 20 is to be connected is different from that of the other surface, it is possible to easily recognize the surface to which the other conductor 20 is to be connected.

Furthermore, the groove 16 extends in the axial direction of the pipe conductor 10 and the ribs 18 protrude on both sides of the groove 16. With this configuration, compared to the case where the connection portion 11 is simply shaped like a flat plate, bending strength in the thickness direction can be improved.

Also, the width of the connection portion 11 is equal to or smaller than the diameter of the pipe main body portion 12. With this configuration, since it is possible to increase the thickness of the connection portion 11 compared to a case where the width of the connection portion is larger than the diameter of the pipe main body, it is possible to improve the strength.

Other Embodiments

The present disclosure is not limited to the embodiments as described above with reference to the drawings, and the following embodiments are also encompassed within the technical scope of the present disclosure, for example.

(1) In the above-described embodiment, the connection portion 11 is formed by being crushed so that the space inside the tubular body is substantially filled, but there is no limitation to this, and a space may also be present inside the connection portion.

(2) Although the above-described embodiment illustrated an example of a press mold, there is no limitation to this, and a configuration is possible in which a groove is formed using a lower mold having a protrusion on the bottom surface.

(3) In the above-described embodiment, only one groove 16 is provided, but there is no limitation to this, and a plurality of grooves may also be provided.

(4) In the above-described embodiment, the other conductor 20 is a twisted conductor formed by twisting together a plurality of metal strands, but there is no limitation to this, and the other conductor may also be another conductor that is not a twisted conductor.

(5) In the above-described embodiment, the groove 16 extends in the axial direction of the pipe conductor 10, but there is no limitation to this, and the groove may also extend in a direction intersecting the axial direction of the pipe conductor.

The invention claimed is:

1. A pipe conductor formed by a conductive tubular body, the pipe conductor comprising:
   a connection for connecting with another conductor, the connection being formed by crushing an end of the conductive tubular body in an axial direction;
   a flat surface formed on a first surface of the connection; and
   a surface having a groove formed on a second surface of the connection, wherein:
   the groove extends from a tip end of the connection in the axial direction towards a main body of the pipe conductor and is recessed in a thickness direction of the connection such that the groove includes side surfaces that extend from a deepest part of the groove in a width direction of the connection so as to be inclined in the thickness direction,
   the axial direction is orthogonal to the thickness direction and the width direction, and
   only the flat surface of the pipe conductor is configured to be in direct contact with an end of the another conductor.

2. The pipe conductor according to claim 1,
   wherein the connection is crushed such that a space inside the conductive tubular body is filled.

3. The pipe conductor according to claim 1,
wherein the groove extends in the axial direction of the conductive tubular body, and ribs protrude on both sides of the groove.

4. The pipe conductor according to claim 1,
wherein a width of the connection is equal to or smaller than a diameter of the conductive tubular body.

5. A conductive path comprising:
the pipe conductor according to claim 1; and
the another conductor connected to the first surface of the connection such that only the flat surface of the pipe conductor is in direct contact with the end of the another conductor.

6. The conductive path according to claim 5, wherein the end of the another conductor that is in direct contact with the flat surface does not include a terminal fitting.

7. The conductive path according to claim 6, wherein another end of the another conductor, which is on an opposite side from the end that is in direct contact with the flat surface, includes a terminal fitting.

8. The pipe conductor according to claim 1, wherein the second surface of the connection includes a plurality of grooves.

* * * * *